United States Patent [19]

Greve

[11] Patent Number: 5,332,084
[45] Date of Patent: Jul. 26, 1994

[54] PIVOT ROD OCCLUSION SYSTEM FOR PLASTIC MODULAR LINK BELTS

[75] Inventor: Christopher G. Greve, Covington, La.

[73] Assignee: The Laitram Corporation, New Orleans, La.

[21] Appl. No.: 126,215

[22] Filed: Sep. 15, 1993

[51] Int. Cl.⁵ ............................................. B65G 17/06
[52] U.S. Cl. ...................................... 198/853; 198/851
[58] Field of Search ........................ 198/850, 851, 853

[56] References Cited

U.S. PATENT DOCUMENTS

| | | | |
|---|---|---|---|
| 3,726,569 | 4/1973 | Maglio et al. | 198/853 X |
| 4,949,838 | 8/1990 | Lapeyre et al. | 198/853 |
| 4,953,691 | 9/1990 | Janzen | 198/851 X |
| 4,953,693 | 9/1990 | Draebel | 198/851 X |
| 5,020,659 | 6/1991 | Hodlewsky | 198/853 |
| 5,058,732 | 10/1991 | Lapeyre | 198/853 X |
| 5,083,660 | 1/1992 | Horton . | |
| 5,096,050 | 3/1992 | Hodlewsky | 198/853 X |
| 5,096,053 | 3/1992 | Hodlewsky | 198/853 |
| 5,105,938 | 4/1992 | Tan . | |
| 5,156,264 | 10/1992 | Lapeyre | 198/853 X |
| 5,253,749 | 10/1993 | Ensch | 198/853 X |

FOREIGN PATENT DOCUMENTS 456146 11/1991 European Pat. Off. ............ 198/853

Primary Examiner—D. Glenn Dayoan
Attorney, Agent, or Firm—Laurence R. Brown; James T. Cronvich

[57] ABSTRACT

An occlusion system is provided for retaining pivot rods of modular link belts in residence in journalled positions within the designated sets of aligned link end apertures with particular advantages in reducing belt wear and maintaining belt lengths more stably in the presence of load and slack conditions. Thus the pivot rods are confined in journalled positions in pivot apertures in the link modular link ends by way of a belt edge occlusion member which is a stiff integral modular member that covers a significant portion of the journalling aperture area. The occlusion member has a notch shaped as a cylindrical segment for mating with a headless flexible pivot rod to guide it into a journalled position with a set of apertures as it is bent to pass the occlusion member in entering or leaving a journalled position within a set of apertures.

9 Claims, 3 Drawing Sheets

5,332,084

1

PIVOT ROD OCCLUSION SYSTEM FOR PLASTIC MODULAR LINK BELTS

TECHNICAL FIELD

This invention relates to plastic modular link belts, and more particularly it relates to entry of pivot rods and retention of pivot rods journalled in place in the belts without dislodging under various belt operating conditions.

BACKGROUND ART

There has been considerable prior art effort to find desirable ways of inserting, occluding in place and removing pivot rods which connect modular links together into a belt. To successfully achieve this, the method of inserting and removing the pivot rods should be conveniently done in the field for repairs, etc. as well as in the factory when making belts. The occlusion must be such that it conforms to different belt working conditions such as loading, tension, slack and path curvature. Also it must be such that there is no chance during a normal range of operating conditions that a journalled pivot rod can escape or move axially away from a specified pivoting position.

There have been problems introduced in the prior art methods of inserting and removing pivot rods because critical alignments of modules and pivot rods are required under special conditions that make it awkward and tedious to assemble belts or to replace defective pivot rods or modular links in the field. Where flexing of occlusion members integrally appended to the belt modules is permitted, there may be failure because of frequent or inadvertent flexing.

Some pivot rod occlusion systems are dependent upon headed or deformed pivot rods, which are expensive and difficult to stock and change in the field. Also detenting arrangements requiring the pivot rod to move are subject to wear and deterioration in use. Any laterally elongated journalling apertures permitting movements of pivot rods along the length of the belt can produce problems of changing belt length and wear under conditions of load and slack.

Representative prior art is J. M. Lapeyre, U.S. Pat. No. 5,058,732, Oct. 22, 1991 and M. K. Tan U.S. Pat. No. 5,105,938, Apr. 21, 1992.

It is therefore an object of the present invention to provide an improved occlusion system and accompanying modules that overcome prior art problems and facilitate the use of cylindrical non-headed pivot rods.

DISCLOSURE OF THE INVENTION

In accordance with this invention therefore, a plastic belt module integrally carries a stiff occluding member having a notch for mating with a cylindrical pivot rod body aligned to partially occlude the axially disposed pivot rod journalling apertures in module link ends. Thus an occluding member is integrally affixed to a modular link at one belt edge to act as a pivot rod guide indentation comprising a segment of a cylinder, preferably less than a semi-cylinder for mating with and guiding into resident position a flexible cylindrical plastic pivot rod. The occluding member disposes the curved indentation with its axis offset from the aligned pivot rod journalling apertures to occlude inserted pivot rods when journalled in place in the link end apertures for pivotably linking modules together, and requiring a flexible plastic headless pivot rod to be flexed and bent in order to insert it into or remove it from the fully inserted journalled pivot rod position. For this insertion, the occluding member integrally formed on the modular link is spaced from the link ends with the pivot rod retaining apertures disposed at a distance permitting insertion within the flexibility characteristics of the plastic pivot rod.

Other objects, features and advantages of the invention are found throughout the following description, claims and appended drawings.

BRIEF DESCRIPTION OF THE DRAWINGS

In the accompanying drawings, wherein like reference characters identify similar features in the various views to facilitate comparison.

THE PREFERRED EMBODIMENTS

Figure 1:
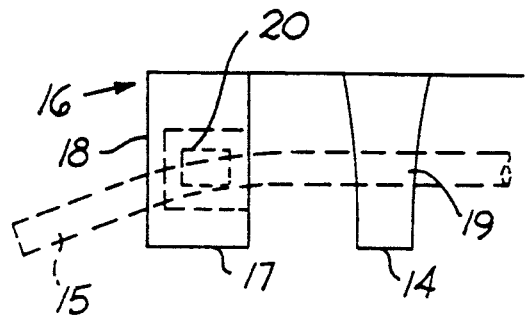
FIG. 1 is a fragmental sketch, looking toward the pivot rod and module link ends, illustrating the manner of inserting or withdrawing a pivot rod that interconnects modules of a modular plastic link belt in accordance with the teachings of this invention.

As may be seen with reference to FIG. 1, a flexible plastic pivot rod 15 may be bent for insertion and mating into the apertures 19 of link ends 14 on module 16. Thus, the occlusion tab 18 is disposed far enough away from the link end 14 to permit a flexible pivot rod 15 to be introduced and removed from a mating journalled position within a plurality of axially aligned apertures 19 in the link ends 14 of the plastic link belt module 16. When fully inserted the pivot rod straightens out and has its left end 20 occluded by the occlusion tab 18 so that it cannot escape from its mated working position under any normal conditions of belt operation.

Figure 4:
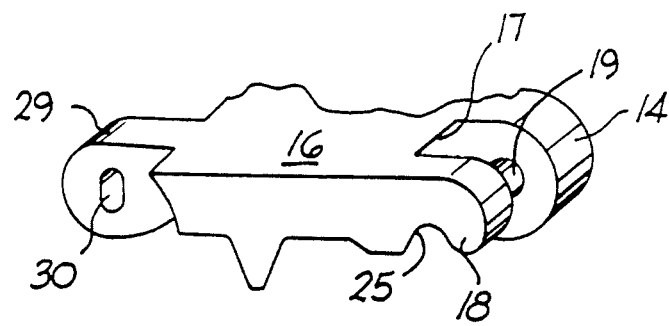
FIG. 4 is a perspective sketch of a portion of a link belt module illustrating the occlusion member at a belt edge side of the module.

The separation of the occlusion tab 18 from the link end 14 is better seen from the perspective sketch of FIG. 4, as supported by the bridging structure 17 of the module. It is noted that the occlusion tab 18 is only provided for one of the sets of aligned apertures 14, and not for the other set 30 in the opposite link ends 29. Thus, the occlusion tab 18 at the head end of one module overlaps the tail end of a leading module with the link ends interleaved thereby so that the two modules pivot about the pivot rod. While some degree of flexibility of occlusion tab 18 could be tolerated, it basically is an integral stiff member in the preferred embodiment as compared with the flexibility of the plastic rod 15.

Figure 2:
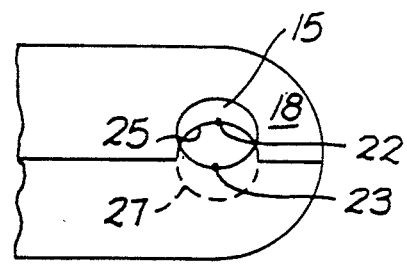
FIG. 2 is a fragmental side view sketch looking into the axis of the aligned pivot rod apertures disposed in the module link ends.
Figure 3:
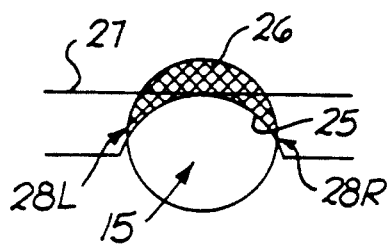
FIG. 3 is a fragmental sketch illustrating the occlusion feature afforded by this invention.

The occluding function may be visualized from the module side view of FIG. 2, wherein the pivot rod 15 cannot escape because of the presence of occlusion tab 18. It is noted here that the occlusion tab 18 contains a curved guide notch 25 for mating with the body of the cylindrical headless pivot rod 15, and thus forms a segmental portion of a cylinder (21) in shape, preferably less than semi-cylindrical. Since the axes 23, 22 of the respective occlusion curvature cylinder and the pivot rod cylinder are offset, this preferred configuration gives a large occlusion area to confront the end of pivot rod (15), as better seen from FIG. 3 wherein the occlusion area 26 is cross hatched. Thus the cross hatched region between the arrows 28L and 28R and the line 27 provides supplemental occlusion that makes the notch 25 advantageous in occlusion as well as in guiding the pivot rod into mating journalled position within the link end apertures to link two modules together.

A couple of advantages result from having the radius of curvature of the notch 25 approximately the same as the radius of the pivot rod 19. First, for a given amount of pivot rod deflection required for insertion, the occlusion area is maximized. Furthermore, because the occlusion area covers a significant portion of the periphery of the end of the rod 19, instead of just a region at one edge, the rod 19 is less likely to deflect the occlusion tab 18 and slip past it. Second, the wear area is distributed fairly uniformly along the inner surface of the cylindrical notch 25, thereby eliminating any concentrated wear spot that would lessen the rod retainability of the occlusion tab 18. This increased wear area is especially valuable in wide belts with long pivot rods.

Figure 5:
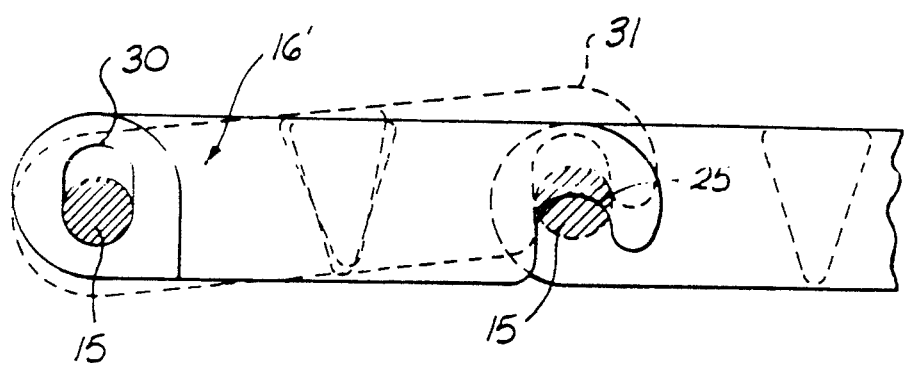
FIG. 5 is a side view sketch of linked modules of a further embodiment of the invention.

As seen in FIG. 5, in this embodiment of the invention, the leftmost set of apertures 30 are oblong vertically to afford a degree of pivoting of the module 16', as shown in phantom (31), during insertion of the pivot rod 15. Thus, less flexible or larger diameter pivot rods may be used, so that optimization of the plastic characteristics for wear and strength during belt tension may include a broader range of materials, and/or heavier, larger diameter pivot rods.

As seen in the embodiment of FIG. 4, at least the outermost end 29 opposite the occlusion tab 18 has a vertically elongated aperture 30. The lower end of the elongated aperture 30 is in overlapping axial alignment with the notch of an interleaved module so that a pivot rod need not be bent so severely during insertion. The upper end of the elongated aperture 30 is axially aligned with the apertures in the aligned link ends journalling the pivot rod.

Figure 6:
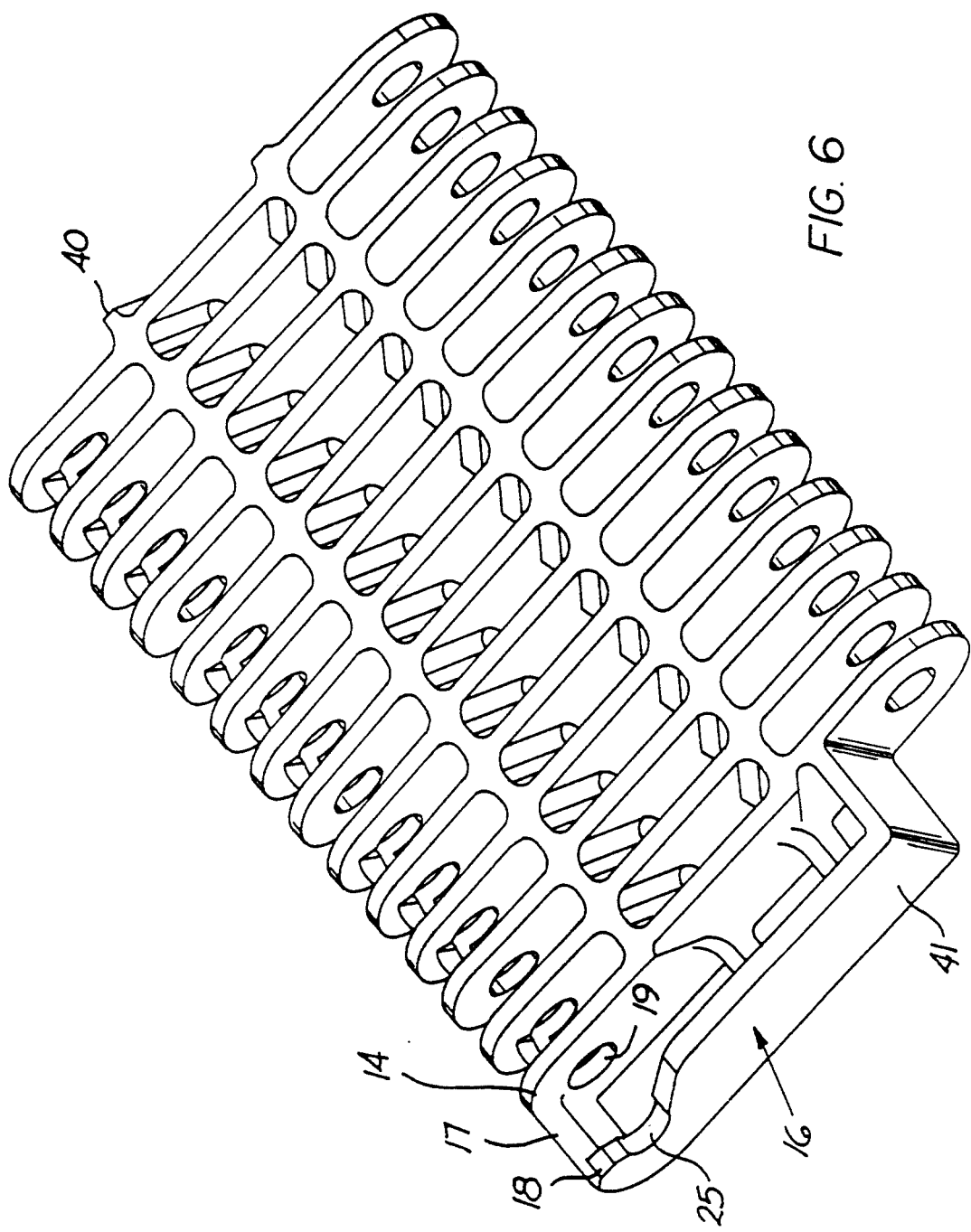
FIG. 6 is a perspective bottom view of a link belt module embodying an occlusion member as afforded by this invention.

The underside of a typical module 16 is shown in FIG. 6, broken away at 40. Such modules may be of various widths for establishing the belt widths or for bricklayering in wider belts, and the notched occlusion edge 41 need only be provided on one belt edge, in which case the opposite edge (not shown) would simply be a blind occlusion plate.

Figure 7:
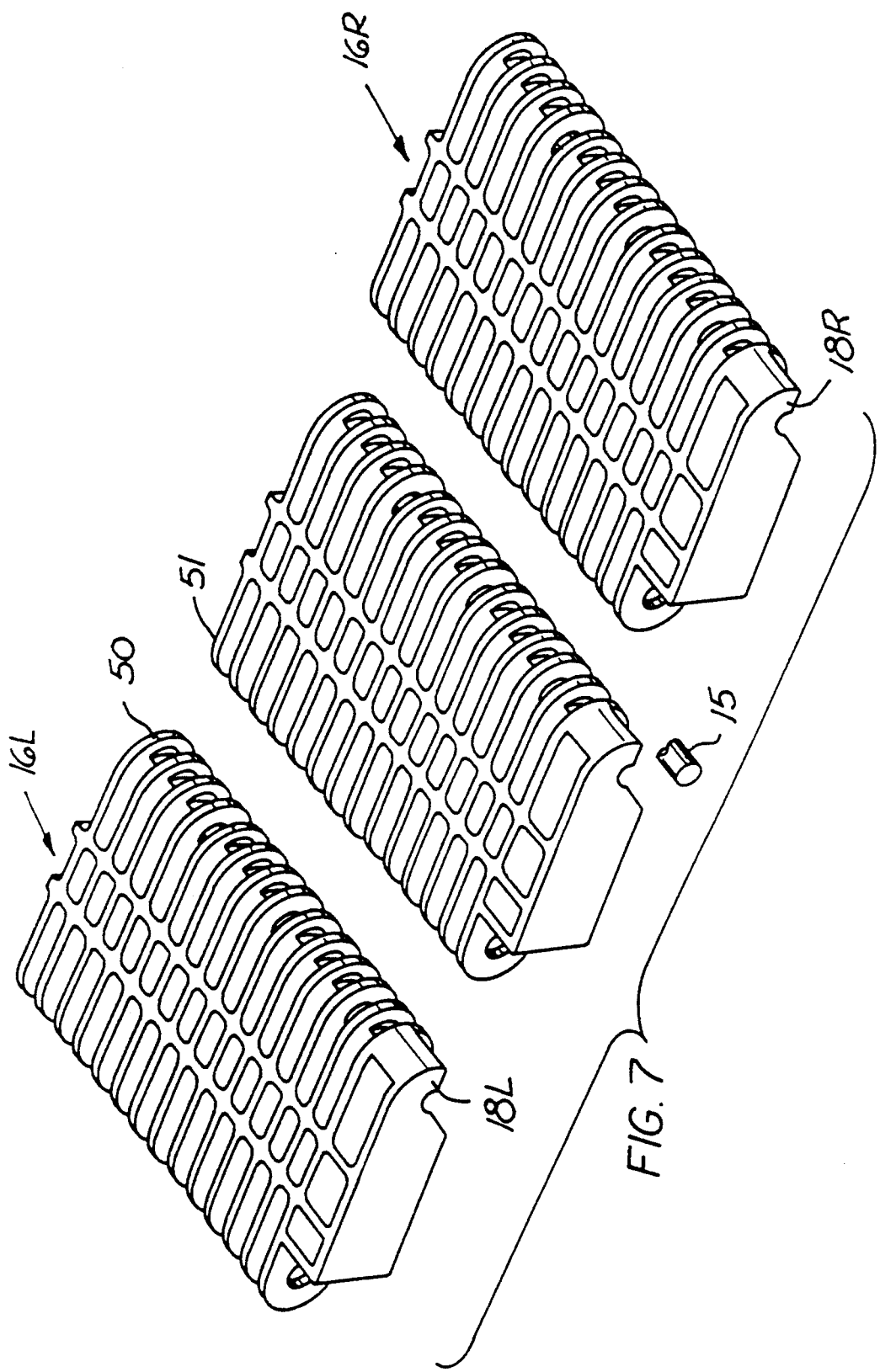
FIG. 7 is a perspective exploded top view representing a modular link belt fragment embodying the invention.

In FIG. 7, it is seen that the modules 16 are aligned with interspersed link ends 50, 51 providing aligned apertures for receiving the pivot rods 15 for linking the modules end to end with the occlusion tabs 18 permitting entry of the pivot rods 15 in the manner aforedescribed. Thus, a belt is formed which gives the significant advantages that there is no movement of the pivot rods fore and aft along the belt during slack and loaded tension working conditions, and no conditions normally encountered in the belt that will tend to dislodge the occluded pivot rods. This is a significant advantage over prior art occlusion systems that permit possible horizontal movement positions of the pivot rods or flexibility of the occlusion structure that might release a pivot rod from its preferred mated position in the apertures. In the present system the pivot rods may only be inserted or removed by individual bending of the pivot rods in a manner that is not possible under normal belt operating conditions.

Therefore having advantageously advanced the state of the art, those features of novelty setting forth the spirit and nature of the invention are defined with particularity in the following claims.

I claim:

1. In a modular link plastic belt system, the improvement for retaining pivot rods axially confined within the belt, in combination comprising: flexible headless cylindrical plastic pivot rods, plastic belt modules having a set of apertured link ends forming a pivot rod journal through a set of apertures axially aligned to receive a said pivot rod, a set of said pivot rods journalled in said apertures for pivotally connecting modules end to end in a belt configuration, and occlusion means adapted to guide and bend said pivot rods for entry into a confined position journalled in the apertures comprising an occluding end piece disposed in a member on the modules at one edge of the belt and spaced from an outermost pivot rod apertured link end and positioned to partially occlude the aligned apertures for intercepting and retaining a journalled pivot rod in the belt, said occlusion means further defining a curved occlusion notch partly cylindrical in shape disposed in a mating position to guide the pivot rods, with the occlusion means covering a segmental portion of the aligned apertures in which a said pivot rod is journalled thereby to intercept and retain a journalled said pivot rod confined in the belt.

2. A plastic module for a longitudinal conveyor belt system having modules connected together by pivot rods aligned in respective sets of apertures axially disposed in link ends in a direction transverse to the conveyor belt, said module being adapted to occlude headless flexible and bendable plastic pivot rods journalled in place within the belt and comprising in combination: interlaceable link ends disposed at two longitudinal extremities of the module and defining a first set of apertures having an axis aligned in two link ends to journal said headless plastic pivot rods for linking modules together to form a belt, and a stiff integral substantially non-flexible occlusion member disposed on one edge of the module to partially occlude a segmental portion of only said first set of journalling apertures in the module and for retaining a said headless pivot rod journalled in place within the first set of journalling apertures, wherein the occlusion member comprises a curved notch partly cylindrical in shape for mating with, bending and guiding one of said flexible plastic pivot rods for insertion during entry into a mating journalled position within said first set of apertures where the occlusion member prevents the pivot rod from leaving the edge of the module.

3. The module of claim 2 wherein the module further comprises: vertically elongated apertures in a further set of apertures permitting the module and accompanying occlusion member to pivot over a limited arc about the further set of journalling apertures for displacement of said occlusion member to facilitate insertion and removal of pivot rods in the first set of journalling apertures.

4. The module of claim 2 wherein the occluding end piece further comprises a module edge portion spaced to align with only one of the two sets of axially aligned apertures in the module, said curved notch being positioned in mating alignment with one said set of axially aligned apertures and enlarged apertures in the other set of apertures permitting the occluding end piece to pivotally deflect for insertion and removal of pivot rods.

5. The module of claim 2 wherein the occlusion member comprises a curved notch having a radius of curvature substantially the same as the radius of the pivot rod.

6. The module of claim 2 wherein the partly cylindrical notch has an axis offset from the axis of the first set of journalling apertures.

7. The module of claim 2 further comprising an outermost link end having a vertically elongated aperture, the top portion of which is aligned with the other set of apertures, the bottom portion of which is aligned with the curved notch of an interleaved other such module.

8. The module of claim 2 wherein the occlusion member comprises a curved notch having a chord length providing less than a semi-cylindrical surface curvature.

9. The modular link belt system improvement of claim 1 wherein said curved occlusion member further comprises a substantially rigid said end piece so spaced that said notch forms an edge against which said flexible plastic rods may be bent and longitudinally moved for insertion of the rods into the aligned apertures.

* * * * *